United States Patent [19]

Tawil et al.

[11] 4,025,608

[45] May 24, 1977

[54] ION EXCHANGE MATERIAL

[75] Inventors: David S. Tawil, Wilmslow; Michael H. Clubley; Frank Farnworth, both of Bolton, all of England

[73] Assignee: Magnesium Elektron Limited, Swinton, England

[22] Filed: Dec. 16, 1974

[21] Appl. No.: 533,291

[30] Foreign Application Priority Data

Dec. 27, 1973 United Kingdom ............ 59749/73

[52] U.S. Cl. .............................. 423/305; 423/311; 75/101 BE; 210/38 C
[51] Int. Cl.² ................. C01B 15/16; C01B 25/26
[58] Field of Search ................ 423/305, 309–313, 423/306; 75/101 BE; 210/37 R, 38

[56] References Cited

UNITED STATES PATENTS

| | | | |
|---|---|---|---|
| 3,416,884 | 12/1968 | Stynes et al. | 423/309 |
| 3,418,072 | 12/1968 | Aret | 423/305 |

FOREIGN PATENTS OR APPLICATIONS

| | | | |
|---|---|---|---|
| 1,309,572 | 12/1961 | France | 423/305 |
| 4,610,412 | 11/1966 | Japan | 423/305 |
| 916,550 | 1/1963 | United Kingdom | 423/311 |
| 1,007,871 | 10/1965 | United Kingdom | 423/311 |

*Primary Examiner*—Earl C. Thomas
*Assistant Examiner*—Gregory A. Heller
*Attorney, Agent, or Firm*—Karl W. Flocks

[57] ABSTRACT

Zirconium phosphate is made by reacting a zirconium salt with phosphoric acid or a phosphate in a liquid medium, the zirconium salt being insoluble in water. A granular product may be obtained having a grain size controlled by that of the salt. The product may be used as an ion-exchange material.

7 Claims, No Drawings

ION EXCHANGE MATERIAL

This invention relates to granular zirconium phosphates which are especially suitable for use in the isolation or separation of inorganic ions from solutions containing them and more especially to inorganic "ion exchangers".

"Ion exchangers" are solid materials which contain a matrix to which are fixed negative or positive charges. In the neutral state, these solids contain displaceable ions of opposite charge (counterions). If the matrix contains a negative charge, the counterions will be positively charged and the material is known as a cation exchanger. In the case of a positively charged matrix the displaceable ions are negatively charged and the material is known as an anion exchanger. Ion exchangers may be inorganic or organic materials, examples of which are clays and zeolites and various resinous organic materials.

Many ions exchangers are insufficiently selective for practical purposes since they exchange numerous ions which may exist together in the solution to be purified or from which it is desired to isolate a single ion. In order to provide more specifically active ion exchange materials many synthetic inorganic materials have been studied, such as the phosphates and silicates of zirconium, thorium, titanium, cerium and aluminium. These are solid materials substantially insoluble in water and in solvents normally used for ion exchange separations.

The application of a zirconium phosphate cation exchanger to the separation of nuclear fission products is described in United States Atomic Authority Commission Report CN-508 (1943). The use of a zirconium phosphate ion exchanger to separate the ammonium ion from its solutions is described in the Bulletin of the Chemical Society of Japan, Vol. 46, pp 836–838 (1973). Extensive studies of the ion exchange properties of various types of zirconium phosphate have been made by A. Clearfield and coworkers: reference is made to "Ion Exchange & Membranes" Vol. 1, pp 91–107, (1972).

The behaviour of zirconium phosphate as an ion exchanger is markedly influenced by its chemical composition and physical form which, in turn, are influenced by the method of preparation of the phosphate. For practical purposes it is desirable that the ion exchange material should have consistent and reproducible behaviour in its absorption of ions and that it should have a high capacity to absorb the particular ion which it is required to isolate or separate. Aslo it is important that the material when packed into a column should allow easy flow of the solution to be treated.

Numerous methods are described in the literature for making zirconium phosphates and these almost invariably involve precipitation of the phosphate from an aqueous solution of a zirconium compound by the addition of phosphoric acid or a soluble phosphate. If phosphoric acid is used, the resultant zirconium phosphate is obtained in the "hydrogen" form, for example as (empirically) $Zr(HPO_4)_2.xH_2O$ which may subsequently be converted or partially converted to the sodium form by treatment with a solution containing sodium ions; the "sodium" form may be, for example $ZrNaH(PO_4)_2 x H_2O$ or $Zr(NaPO_4)_2 x H_2O$. When such an ion exchanger is used to extract ammonium ions from solutions containing ammonium salts, the ammonium ions are taken up by the ion exchanger in replacement or partial replacement of the sodium ions which pass into solution. An example of such a use of a zirconium phosphate is given in U.S. Pat. No. 3,669,880 which describes a dialysis system for use with an artificial kidney machine in which ammonium ions formed by the action of the enzyme urease on urea are removed from the dialysate solution by passage through a column of zirconium phosphate ion exchanger.

An ion exchange material should fulfil certain physical requirements if it is to function satisfactorily in ion-exchange equipment of known type. In particular it should be of granular form and have a grain size which allows an adequate flow of liquid through a mass of the grains while allowing adequate ion-exchange to take place.

According to one aspect of the present invention, there is provided a method of preparing zirconium phosphate which comprises allowing a solid zirconium salt to react with liquid medium comprising phosphoric acid or a phosphate, said zirconium salt being substantially insoluble in water.

The liquid medium may be an aqueous solution, although non-aqueous solvents may be used if desired, and the solid zirconium salt may be basic zirconium sulphate or a zirconium carbonate. The phosphate may be of an alkali metal or ammonium when it is desired that the zirconium phosphate should contain alkali metal or ammonium ions.

The solid zirconium phosphate obtained may be separated from the reaction medium by conventional means, such as filtration or sedimentation, and dried. The product thus obtained may be a granular material directly suitable for use in an ion exchange column. When the basic sulphate is reacted with phosphoric acid, a zirconium phosphate in the "hydrogen" form is obtained. Optionally, this product may be contacted with an alkaline solution and/or an alkali metal salt solution to convert the ion exchanger wholly or partly to the neutral state by replacement or partial replacement of hydrogen ions by alkali metal ions. If desired the hydrogen ions may similarly be replaced by ammonium ions or by other cations.

When the basic sulphate is reacted with an alkali metal or ammonium phosphate, a solid zirconium phosphate already containing alkali metal or ammonium ions is obtained and its conversion step is unnecessary.

The product obtained by this process, may be a solid zirconium phosphate of empirical constitution $ZrH_aM_b(PO_4)_c.dH_2O$ in which '$a$' lies between 0 and 2, '$b$' lies between 0 and 2, '$c$' lies between 1 and 2, '$d$' lies between 1 and 7, 'M' is a monovalent cation, $a + b + 4 = 3c$ and $a$, $b$, $c$ and $d$ are integral or non-integral numbers.

It is generally desirable that the mean particle size of the zirconium phosphate for use in ion-exchange should be at least 30 microns, as a smaller size seriously obstructs the flow of liquid through a mass of the ion-exchange material. Grain sizes of at least 30 microns are readily obtainable directly by the present invention.

It is believed that the process according to the invention has several important advantages over the processes hitherto known. Zirconium basic sulphate is an article of commerce available at lower cost per unit of zirconium than soluble salts of zirconium hitherto employed, such as the oxychloride, oxynitrate and the orthosulphate of zirconium. Also, in processes previously known, in which the phosphate is precipitated from a solution of a soluble zirconium salt, the precipitate obtained is usally gelatinous and very difficult to filter, producing a filter cake with a high content of water which has to be removed by very slow and careful drying to avoid disintegration to fine powder in which form it would be useless as an ion exchanger in a packed column. Moreover, the dried product is generally a glassy mass which requires to be disintegrated to produce a granular product of a desirable particle size distribution for use in a packed column, with consequent wastage of product in the unavoidable rejection of "fines". The process according to the invention avoids these difficulties in that the product of the interaction of the solid zirconium salt and phosphoric acid or a phosphate normally has a particle size distribution which is controlled by that of the zirconium salt from which it was prepared and thus a granular zirconium phosphate can be obtained directly in the desired particle size distribution merely by selection of a granular zirconium salt of the correct mean grain size and size distribution. Such compounds, including the basic sulphate, having suitable particle size characteristics are available commercially and methods of obtaining them have been published, for example in British patent specification No. 971,594. There is therefore no need to disintegrate the zirconium phosphatae product which can be employed directly in an ion exchange column. Moreover the zirconium phosphate product, being granular, and readily filterable produces a relatively dry filter cake which can be readily dried without producing unwanted "fines" but remains in granular form.

Preferred embodiments of the invention will now be described in the following non-limiting examples.

EXAMPLE 1

420 g. of zirconium basic sulphate (containing 125 g. of Zr expressed as $ZrO_2$) was slurried with 1250 ml. water and 278 g. of 85% orthophosphoric acid were added gradually with stirring. The slurry was heated to 80° C and maintained at this temperature for one hour. It was then filtered and the residue washed with cold water until the washings were substantially free from sulphate and phosphate anions. The filter cake was dried at a temperature of 40° C until the dried product contained 8 to 10% of total moisture. There was thus obtained 280 g. of zirconium phosphate ion-exchanger in the hydrogen form corresponding approximately to the empirical formula $ZrH_{2.1}(PO_4)_{1.9}.2.0\ H_2O$. The mean particle size of the product was 40 microns and 90% of the particles were contained in the size range 35 to 45 microns. These particle size characteristics corresponded closely to those of the zirconium basic sulphate.

EXAMPLE 2

The procedure described in Example 1 was repeated except that the filter cake, instead of drying, was slurried with 1250 ml. of water, and 12 g. sodium chloride and 115 ml. of 10 N sodium hydroxide were added to bring the pH to 6. The slurry was then filtered, washed and dried as in Example 1 to yield 320 g. product having the following analysis by weight:

| Zr expressed as $ZrO_2$ | 36.5% |
|---|---|
| $PO_4$ | 52% |
| Na | 7.5% |
| $H_2O$ | 9% |

EXAMPLE 3

420 g. of zirconium basic sulphate (containing 125 g. Zr expressed as $ZrO_2$) was slurried with 1250 ml. of water and 390 g. of sodium dihydrogen phosphate dihydrate were added gradually with stirring. The slurry was heated to 80° C for one hour. 12 g. of sodium chloride was added followed by 107 ml of 10 N sodium hydroxide solution to bring the pH to 6. It was then filtered and washed with cold water and dried at 40° C. until the total moisture content was reduced to 8 to 10%. The weight of product was 320 g. and the product had the analysis be weight:

| Zr expressed as $ZrO_2$ | 37.6% |
|---|---|
| $PO_4$ | 44.6% |
| Na | 7.9% |
| $H_2O$ | 8.2% |

EXAMPLE 4

This example describes the use of one of the products of the invention as an ion exchanger.

The zirconium phosphate was prepared as in Example 2. 5.0 g. of the sample was transferred to a conical flask containing 100 ml. of test solution (containing 0.58 g. of sodium chloride, 0.44 g. of sodium acetate trihydrate and 0.31 g. of ammonium chloride). The mixture was shaken for one hour and then filtered. The ammonium ion concentration of the filtrate was determined by the following method.

25 ml. of the filtrate was transferred to a 500 ml. distillation flask containing 100 ml. of 10% sodium hydroxide solution and 250 ml. of water. The mixture was distilled for one hour and the distillate collected in a beaker containing 100 ml. of water and 20 ml. of 0.1 N hydrochloric acid solution. This solution was then titrated with 0.1N sodium hydroxide solution.

The titrate was 17.3 ml. equivalent to an ammonia pick-up by the zirconium phosphate of 80%.

EXAMPLE 5

The procedure of Example 1 was followed, except that 312 g. of basic zirconium carbonate containing 125 g. of Zr expressed as $ZrO_2$, was used instead of the zirconium basic sulphate. 275 g. of zirconium phosphate having an approximate empirical formula of $Zr(HPO_4)_2.2H_2O$ and a mean particle size of 45 microns were obtained. The product could be used as an ion exchanger in the manner described in Example 4.

As stated above, the zirconium phosphates made by processes according to the invention are useful as ion exchange materials. However they also find other applications, including filtration processes in which ions or compounds are removed from a liquid by a process which does not proceed by an ion exchange mechanism, and in certain processes for removal of ions in which it is not yet definitely established whether ion exhange or filtration mechanisms are involved. These zirconium phosphates also find uses as pigments and catalysts, particularly for gas-phase reactions.

We claim:

1. A method of preparing granular zirconium phosphate of a predetermined particle size distribution which comprises reacting a solid substantially water-insoluble zirconium salt other than zirconium phosphate and having said predetermined particle size distribution with a liquid medium comprising phosphoric acid or a phosphate, said phosphoric acid or phosphate being present in an amount sufficient to give a zirconium phosphate having a phosphate to zirconium mole ratio from 1.0 to 2.0; and thereby obtaining a granular zirconium phosphate having the particle size of said starting zirconium salt and a phosphate to zirconium mole ratio of 1.0 to 2.0.

2. A method according to claim 1, in which the liquid is an aqueous solution.

3. A method according to claim 1, in which the phosphate is selected from alkali metal and ammonium phosphates.

4. A method according to claim 1, in which the solid zirconium salt is a basic zirconium carbonate.

5. A method according to claim 1, in which the solid zirconium salt is a basic zirconium sulphate.

6. A method according to claim 1, in which the particle size of the zirconium salt is chosen so that the zirconium phosphate has a mean particle size of at least 30 microns.

7. A method according to claim 1, in which the zirconium phosphate obtained has an empirical constitution $Zr\ H_a\ M_b\ (PO_4)_c \cdot dH_2O$, wherein M is a monovalent cation, $a$ is from 0 to 2, $b$ is from 0 to 2, $c$ is from 1 to 2, $d$ is from 1 to 7, and $a + b + 4 = 3c$, wherein $a, b, c$ and $d$ are integral or non-integral numbers.

* * * * *